(12) United States Patent
Tanaka et al.

(10) Patent No.: US 11,576,461 B2
(45) Date of Patent: *Feb. 14, 2023

(54) SHOE SOLE MEMBER, METHOD FOR PRODUCING THE SAME, AND SHOE

(71) Applicant: ASICS CORPORATION, Kobe (JP)

(72) Inventors: Yoshihito Tanaka, Kobe (JP); Shintaro Nagata, Kobe (JP); Takuro Kamimura, Kobe (JP); Hideyuki Miyazaki, Kobe (JP)

(73) Assignee: ASICS CORPORATION

(*) Notice: Subject to any disclaimer, the term of this patent is extended or adjusted under 35 U.S.C. 154(b) by 0 days.

This patent is subject to a terminal disclaimer.

(21) Appl. No.: 17/491,747

(22) Filed: Oct. 1, 2021

(65) Prior Publication Data

US 2022/0015501 A1 Jan. 20, 2022

Related U.S. Application Data

(63) Continuation of application No. 15/314,893, filed as application No. PCT/JP2015/076782 on Sep. 18, 2015, now Pat. No. 11,166,521.

(30) Foreign Application Priority Data

Sep. 28, 2015 (JP) .................................. 2015/076782

(51) Int. Cl.
*A43B 13/04* (2006.01)
*A43B 7/142* (2022.01)
(Continued)

(52) U.S. Cl.
CPC .............. *A43B 13/04* (2013.01); *A43B 7/142* (2013.01); *A43B 7/144* (2013.01); *A43B 13/188* (2013.01); *A43B 17/14* (2013.01); *B29D 35/122* (2013.01)

(58) Field of Classification Search
CPC ......... A43B 7/142; A43B 7/144; A43B 13/04; A43B 13/188; A43B 17/14
See application file for complete search history.

(56) References Cited

U.S. PATENT DOCUMENTS

2011/0232135 A1 9/2011 Dean et al.
2011/0283560 A1* 11/2011 Portzline .............. A43B 13/186
36/31

(Continued)

FOREIGN PATENT DOCUMENTS

DE 20 2007 018343 U1 5/2008
JP S5997601 U 7/1984

(Continued)

OTHER PUBLICATIONS

Office Action for Japanese Application No. 2016-535745 dated Mar. 3, 2017.

(Continued)

*Primary Examiner* — Zachary M Davis
(74) *Attorney, Agent, or Firm* — Katten Muchin Rosenman LLP (57) ABSTRACT

Provided is a shoe sole member formed by at least two types of polymer compositions, a first composition and a second polymer composition, including: a first part formed by the first polymer composition; a second part formed by the second polymer composition; and a third part formed by a mixture of the first polymer composition and the second polymer composition between the first part and the second part.

9 Claims, 6 Drawing Sheets

(51) Int. Cl.
     *A43B 7/144*         (2022.01)
     *A43B 13/18*       (2006.01)
     *A43B 17/14*       (2006.01)
     *B29D 35/12*      (2010.01)

(56) References Cited

U.S. PATENT DOCUMENTS

| | | | | |
|---|---|---|---|---|
| 2012/0233877 A1* | 9/2012 | Swigart | .................. | A43B 7/142 36/28 |
| 2013/0340280 A1* | 12/2013 | Swigart | .................. | A43B 13/02 36/43 |

FOREIGN PATENT DOCUMENTS

| | | |
|---|---|---|
| JP | S62-75703 U | 5/1987 |
| JP | H03-079704 U | 4/1991 |
| JP | H05-329005 A | 12/1993 |
| JP | H09-057874 A | 3/1997 |
| JP | 05433008 B2 | 3/2014 |
| WO | 2011/146665 A2 | 11/2011 |
| WO | 2014/150122 A2 | 9/2014 |

OTHER PUBLICATIONS

Extended European Search Report for European Patent Application No. 15 89 2798 dated Jan. 5, 2018.
Office Action for Japanese Patent Application No. 2016-535745 dated Mar. 3, 2017.

* cited by examiner

SHOE SOLE MEMBER, METHOD FOR PRODUCING THE SAME, AND SHOE

CROSS REFERENCE TO RELATED APPLICATIONS

This application is a continuation application of U.S. patent application Ser. No. 15/314,893 filed on Mar. 9, 2018, which is a national stage application, filed under 35 U.S.C. § 371, of International Application No PCT/JP2015/076782 filed on Sep. 18, 2015, the entire contents of which is incorporated herein by reference in its entirety.

FIELD

The present invention relates to a shoe sole member and a shoe, more specifically, to a shoe sole member used, for example, as an inner sole, a sock liner, a midsole, and an outer sole, and a shoe including such a shoe sole member.

BACKGROUND

Shoes used for various competitions are composed of many members, and a shoe sole, for example, is composed of shoe sole members such as an inner sole, a sock liner, a midsole, and an outer sole. Conventionally, shoes are formed by using shoe sole members partially having different hardness so that the shoes have comfort. For example, Patent Literature 1 below discloses producing a shoe sole member partially having different hardness by heating a plurality of foam members, called "phylon biscuits", contained in a plastic mold to foam the plurality of members within the plastic mold and to integrate these members together.

CITATION LIST

Patent Literature

Patent Literature 1: JP 5433008 B

SUMMARY

Technical Problem

In the production method according to Patent Literature 1, a shoe sole member with a portion formed by one of the plurality of members that have been integrated together in the plastic mold having different properties from the other portions can be obtained by producing the member using a polymer composition different from those for the other members. However, the shoe sole member obtained by the production method according to Patent Literature 1 has cushioning properties that suddenly changes at the boundary between the members having different hardness when such members are adjacent to each other. Shoes including such a shoe sole member may possibly give uncomfortable feeling to the user and may fail to give sufficient comfort.

It is therefore an object of the present invention to provide a shoe sole member that is effective in forming a shoe giving excellent comfort, and to provide a shoe giving excellent comfort.

Solution to Problem

In order to solve the above-described problem, a shoe sole member according to the present invention is formed by at least two types of polymer compositions, a first polymer composition and a second polymer composition, and includes: a first part formed by the first polymer composition; a second part formed by the second polymer composition, and a third part formed by a mixture of the first polymer composition and the second polymer composition between the first part and the second part.

Further, in order to solve the above-described problem, a shoe according to the present invention includes the above-described shoe sole member.

DESCRIPTION OF EMBODIMENTS

A shoe sole member of the present invention will be described by showing an embodiment thereof as an example. The shoe sole member of the present invention is formed by at least two types of polymer compositions, a first polymer composition and a second polymer composition, and includes: a first part formed by the first polymer composition; a second part formed by the second polymer composition; and a third part formed by a mixture of the first polymer composition and the second polymer composition between the first part and the second part. In the shoe sole member, the third part provided between the first part and the second part is formed by the mixture of the first polymer composition and the second polymer composition, and therefore intermediate properties between the first part and the second part can be exerted by the third part. Accordingly, the shoe sole member can suppress a significant change in properties between the first part and the second part, thereby allowing a shoe to have excellent comfort.

In order to allow the shoe to have further excellent comfort, it is preferable that the shoe sole member of this embodiment have a flat shape, and the first part and the second part be adjacent to each other via the third part in the horizontal direction. Further, in order to allow the shoe to have further excellent comfort, it is preferable that, when a sectional area of the first part is denoted by S11, a sectional area of the second part is denoted by S12, and a sectional area of the third part is denoted by S13, in a cross section orthogonal to a central axis of the shoe, the shoe sole member of this embodiment satisfy the following relational expression (1):

$$5\% \leq [100 \times S13/(S11+S12+S13)] < 100\% \qquad (1).$$

In the shoe sole member of this embodiment, it is preferable that the first part be harder than the second part, and when an Asker C hardness of the third part in the cross section is measured while the measurement point is moved from the first part side toward the second part side, a value of the Asker C hardness decrease toward the moving direction. According to such a preferable aspect, local generation of a strong reaction force upon application of pressure in the thickness directions of the shoe sole member can be more reliably suppressed.

In the shoe sole member of this embodiment, it is preferable that the value of the Asker C hardness of the third part in the cross section change both when the measurement point is moved in the horizontal direction and when the measurement point is moved in the vertical direction. According to such a preferable aspect, the shoe sole member can have a change in cushioning properties not only in the horizontal direction but also in the vertical direction, which can allow the shoe sole member to have a three-dimensional property change.

In the shoe sole member of this embodiment, it is preferable that the first part be arranged in an inner foot, and the second part be arranged more in an outer foot than the first part. A shoe can be more comfortable by including the shoe sole member of such a preferable aspect.

It is preferable that, when a sectional area of the first part is denoted by S21, a sectional area of the second part is denoted by S22, and a sectional area of the third part is denoted by S23, in a vertical section that is a vertical plane parallel to a central axis of the shoe, the shoe sole member of this embodiment satisfy the following relational expression (4):

$$5\% \leq [100 \times S23/(S21+S22+S23)] < 100\% \qquad (4).$$

Further, in the shoe sole member of this embodiment, it is preferable that the first part be harder than the second part, and when the Asker C hardness of the third part in the vertical section is measured while the measurement point is moved from the first part side toward the second part side, a value of the Asker C hardness decrease toward the moving direction. A shoe can be more comfortable by including the shoe sole member of such a preferable aspect.

Figure 1:
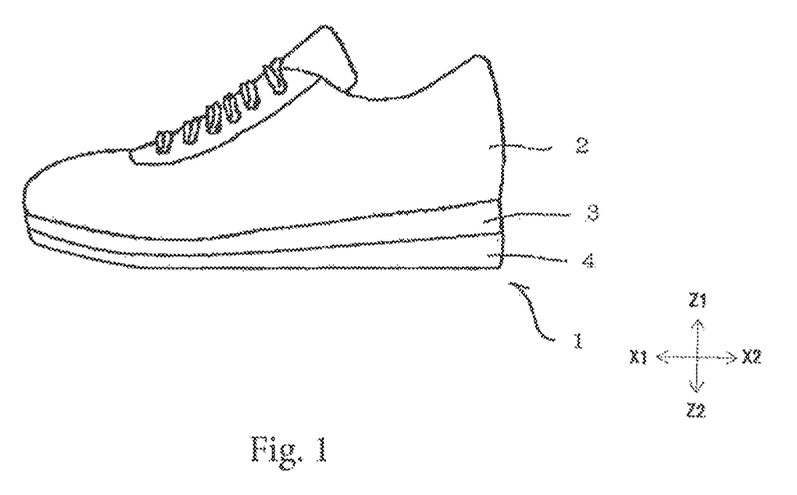
FIG. 1 is a schematic side view showing an aspect of a shoe including a shoe sole member.
Figure 2:
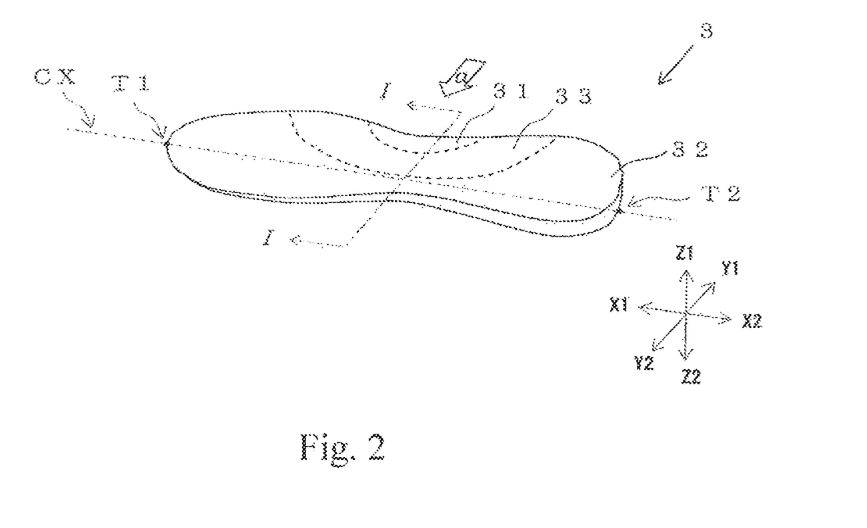
FIG. 2 is a schematic perspective view showing a midsole of an aspect.
Figure 3:
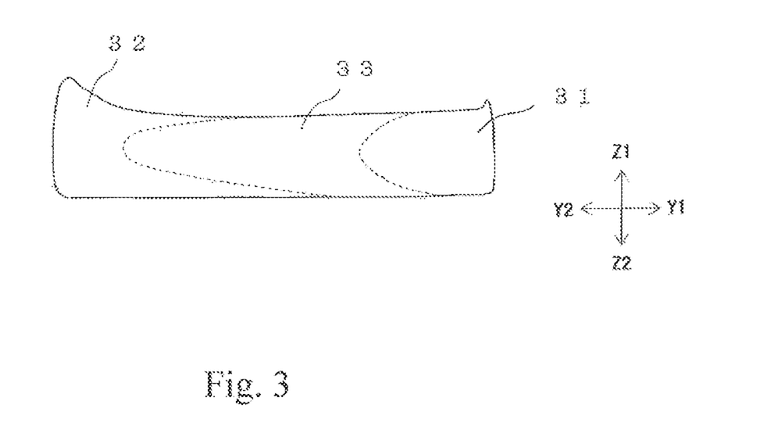
FIG. 3 is a schematic sectional view showing a section of the midsole shown in FIG. 2.

That is, the shoe of this embodiment can give comfort to the user by including the above-described shoe sole member. FIG. 1 shows a shoe formed using the shoe sole member of this embodiment. The shoe 1 has an upper material 2 and shoe sole members 3 and 4. The shoe 1 has a midsole 3 and an outer sole 4 as the shoe sole members. FIG. 2 shows the midsole 3, and FIG. 3 is a sectional view of the midsole 3.

Hereinafter, the shoe sole member of the present invention will be described by way of the midsole 3 as an example. In the following description, directions along the central axis CX of the shoe connecting the most distal end T1 of the tiptoe and the most end T2 of the heel are referred to as "length directions" of the shoe, in which the direction shown by the arrow X1 in the figures is referred to as "forward", and the direction shown by the arrow X2 is referred to as "backward". Further, in the following description, among directions orthogonal to the central axis CX of the shoe, directions parallel to the horizontal plane are referred to as "width directions" of the shoe, and directions parallel to the vertical plane are referred to as "height directions" or "thickness directions" of the shoe. Further, in the following description, among the "width directions", the direction shown by the arrow Y1 in the figures is referred to as "inside", and the direction shown by the arrow Y2 is referred to as "outside". Further, in the following description, among the "height directions" or "thickness directions", the direction shown by the arrow Z1 in the figures is referred to as "upward", and the direction shown by the arrow Z2 is referred to as "downward".

The midsole 3 of this embodiment is formed by at least two polymer compositions, and is formed by two types of polymer compositions, a first polymer composition (hereinafter, also referred to simply as "first composition") and a second polymer composition (hereinafter, also referred to simply as "second composition"). The midsole 3 includes a first part 31 formed by the first composition and a second part 32 formed by the second composition, and includes a third part 33 formed by a mixture of the first composition and the second composition between the first part 31 and the second part 32.

In the midsole 3 of this embodiment, the first part 31 and the second part 32 are formed by different polymer compositions, thereby having different properties from each other. In the midsole 3, the first composition is harder than the second composition, and the first part 31 is harder than the second part 32. Specifically, the first part 31 and the second part 32 have different Asker C hardness as measured at 23° C. using a C-type spring hardness tester of JIS K7312.

The midsole 3 has a flat shape, and its contour in plain view is in the same shape as the contour of the shoe 1. In the midsole 3, the first part 31 and the second part 32 are adjacent to each other via the third part 33 in the horizontal direction, where the first part 31 is arranged at a position corresponding to the inner foot, and the second part 32 is arranged at a position corresponding to the outer foot. More specifically, the first part 31 is arranged at a position corresponding to the plantar arch on the inner side of the midfoot, the second part 32 is arranged at positions corresponding to the forefoot, the hindfoot, and the outer side of the midfoot, and the third part 33 is arranged between the first and second parts. That is, the third part 33 is arranged along the outer edge of the plantar arch.

The midsole 3 of this embodiment preferably has appropriate cushioning properties. Therefore, the Asker C hardness of the first part 31 is preferably 80° or less, more preferably 75° or less. Further, the Asker C hardness of the second part 32 is preferably 65° or less, more preferably 60° or less. However, if the midsole 3 has an excessively low hardness, it is difficult to allow the shoe 1 including the shoe sole member to have sufficiently good foot comfort. Accordingly, the Asker C hardness of the first part 31 is preferably 50° or more, more preferably 60° or more. Further, the Asker C hardness of the second part 32 is preferably 35° or more, more preferably 40° or more.

The difference in Asker C hardness between the first part 31 and the second part 32 is preferably 4° or more and 20° or less, more preferably 8° or more and 16° or less.

The midsole 3 in which the first part 31 that is harder than the second part 32 as described above is arranged in the plantar arch can prevent the user of the shoe 1 from losing balance when the user walks or runs. That is, the shoe 1 of this embodiment can prevent a foot of the user from leaning inward during walking and running by the relatively hard first part 31 being arranged in the inner foot. Further, the shoe 1 of this embodiment is less likely to make the user feel uncomfortable due to the difference in hardness between the first part 31 and the second part 32, because the third part 33 is present between the first part 31 and the second part 32. Accordingly, the user can feel comfortable during walking or running by wearing the shoe 1 of this embodiment.

Further, the midsole 3 is preferably formed to have a repulsive elastic force in the thickness directions gradually increasing from the inner side to the outer side. In order to achieve this, the presence ratio of the third part 33 in the midsole 3 is preferably higher. On the other hand, when the presence ratio of the third part 33 is excessively high, the presence ratios of the first part and the second part decrease. In such a case, the first part and the second part may be disabled to function sufficiently. Therefore, in the midsole 3, the ratio of the third part 33 in a cross section cut in a plane orthogonal to the central axis CX of the shoe preferably falls within a certain range. Specifically, the midsole 3 of this embodiment preferably satisfies the following relational expression (1), more preferably satisfies the following relational expression (2), further preferably satisfies the following relational expression (3), when the sectional area of the first part 31 is denoted by S11 (cm$^2$), the sectional area of the second part 32 is denoted by S12 (cm$^2$), and the sectional area of the third part 33 is denoted by S13 (cm$^2$), in a cross section cut in a plane orthogonal to the central axis CX of the shoe.

$$5\% \leq [100 \times S13/(S11+S12+S13)] < 100\% \quad (1)$$

$$5\% \leq [100 \times S13/(S11+S12+S13)] \leq 80\% \quad (2)$$

$$15\% \leq [100 \times S13/(S11+S12+S13)] \leq 80\% \quad (3)$$

Further, the midsole 3 preferably satisfies the relational expression (1) in the cross section passing through at least the center of the plantar arch in the length directions. The midsole 3 preferably satisfies the relational expression (1) in all cross sections when the area of each part in the cross sections is determined within an interval of 10 mm or more that is continuous in the length directions, and preferably satisfies the relational expression (1) in all cross sections within an interval of 20 mm or more. The interval in which the relational expression (1) is satisfied is generally 150 mm or less. The sectional area of each part in the midsole 3 can be determined as follows.

(Method for Determining Sectional Area of Each Part)

First, the midsole 3 is cut along the surface on which the hardness is measured.

Subsequently, the midsole 3 is sliced along surfaces parallel to the measured surface, and test pieces with a thickness of about 5 mm are collected.

Then, the area of the surfaces (S11+S12+S13) on which the hardness is measured is determined.

This area can be determined using a projector or the like.

Subsequently, the Asker C hardness is measured at a plurality of points in a region away from the second part as much as possible among the cross sections of the first part, and the lowest value in the obtained data is taken as the standard hardness (H1) of the first part.

Likewise, the Asker C hardness is measured at a plurality of points in a region away from the first part as much as possible among the cross sections of the second part, and the highest value in the obtained data is taken as the standard hardness (H2) of the second part.

Finally, the Asker C hardness of all the cross sections of the test pieces is measured. Then, regions with a hardness equal to or more than the standard hardness (H1) of the first part are recognized as the cross sections of the first part, and regions with a hardness equal to or less than the standard hardness (H2) of the second part are recognized as the cross sections of the second part, to determine each area (S11 and S12).

Further, the sectional area of the third part (S13) can be calculated by subtracting the sectional area of the first part (S11) and the sectional area of the second part (S12) from the area of the test pieces that has been first determined.

In the case where the first composition and the second composition contain distinguishable components, and the boundary between the first part and the third part and the boundary between the second part and the third part can be determined by concentration analysis of the components or the like, the sectional area of each part (S11, S12, and S13) may be determined by the componential analysis.

Further, the change in hardness of the third part 33 from the first part side toward the second part side is preferably gradual. Accordingly, the hardness of the third part in the cross sections preferably gradually decrease as measured while the measurement point is moved from the first part side toward the second part side. That is, the midsole 3 of this embodiment preferably has a decreasing amount of hardness per unit length in the moving direction of 0.1°/mm or less throughout the third part 33, when the hardness of the third part 33 in the cross sections is measured while the measurement point is moved in the horizontal direction from the inner side toward the outer side.

The hardness of the third part 33 can be determined, for example, by measuring the Asker C hardness at intervals of 1 mm along the horizontal line passing through the center of the third part 33 in the thickness directions. The third part 33 preferably shows a decrease in hardness as described above at least in the cross section passing through the center of the plantar arch in the length directions. The midsole 3 preferably shows a decrease in hardness as described above in all cross sections when the hardness of the third part 33 in the cross sections is determined within an interval of 10 mm or more that is continuous in the length directions, and preferably shows a decrease in hardness as described above in all cross sections within an interval of 20 mm or more. The interval within which such a decrease in hardness as described above is shown is generally 100 mm or less.

The hardness of the third part in the cross sections preferably changes not only in the case where the measurement point is moved in the horizontal direction but also in the case where the measurement point is moved in the vertical direction. That is, the midsole 3 of this embodiment preferably has a hardness gradually decreasing in the moving direction of the measurement point, when the hardness of the third part 33 in the cross sections is measured while the measurement point is moved upward from the center in the thickness directions. Further, the midsole 3 of this embodiment preferably has a hardness gradually decreasing in the moving direction of the measurement point, when the hardness of the third part 33 in the cross sections is measured while the measurement point is moved downward from the center in the thickness directions.

The midsole 3 is preferably formed by a polymer foam in that such a change in hardness is easily made and excellent cushioning properties are easily exerted.

The midsole 3 made of a polymer foam can be produced, for example, by a method in which a substantially non-foamed preform that is smaller than the midsole 3 is first produced, and the preform contained in a forming mold with a cavity corresponding to the shape of the midsole 3 is heated in the cavity to be foamed.

The preform can be produced, for example, by injection molding, and can be produced by using an injection apparatus including a forming mold having a cavity corresponding to the preform, a nozzle configured to introduce the polymer composition into the cavity, and a cylinder configured to melt and knead the polymer composition and to supply it to the nozzle. More specifically, the preform can be produced, for example, by performing the following steps (a) to (c) using an injection apparatus having a forming mold having a runner that guides the molten polymer composition supplied from the nozzle into the cavity and that is open at a position corresponding to the plantar arch, and at least two cylinders, a first cylinder and a second cylinder, as the aforementioned cylinder:

(a) Step of heating the first composition containing a foaming agent and the second composition containing a foaming agent in the injection apparatus to be melted;

(b) Step of supplying the second composition from the first cylinder to the forming mold through the nozzle in an amount smaller than the volume of the cavity, and stopping the supply of the second composition in the state where an extra space remains in the forming mold; and (c) Step of supplying the first composition from the second cylinder to the forming mold through the nozzle after stopping the supply of the second composition to fill the remaining space in the forming mold with the first composition.

By performing steps (a) to (c) above, a preform in which a part away from a part corresponding to the plantar arch is formed by the second composition, the part corresponding to the plantar arch is formed by the first composition, and the boundary of these portions is formed by a mixture of the first composition and the second composition can be produced. Then, by foaming the preform as described above, the midsole as shown in FIG. 2 can be produced.

As raw materials for the midsole such as the first composition and the second composition, general raw materials can be employed.

As polymers to serve as the main components of the first composition and the second composition, one or two or more selected, for example, from olefin polymers such as polyethylene (e.g., linear low-density polyethylene (LLDPE) and high-density polyethylene (HDPE)), polypropylene, ethylene-propylene copolymer, propylene-1-hexene copolymer, propylene-4-methyl-1-pentene copolymer, propylene-1-butene copolymer, ethylene-1-hexene copolymer, ethylene-4-methyl-pentene copolymer, ethylene-butene copolymer (EBM), 1-butene-1-hexene copolymer, 1-butene-4-methyl-pentene, ethylene-methacrylic acid copolymer, ethylene-methyl methacrylate copolymer, ethylene-ethyl methacrylate copolymer, ethylene-butyl methacrylate copolymer, ethylene-methyl acrylate copolymer, ethylene-ethyl acrylate copolymer, ethylene-butyl acrylate copolymer, propylene-methacrylic acid copolymer, propylene-methyl methacrylate copolymer, propylene-ethyl methacrylate copolymer, propylene-butyl methacrylate copolymer, ethylene-vinyl acetate copolymer (EVA), and propylene-vinyl acetate copolymer can be employed.

Further, as such polymers other than the olefin polymers, one or two or more selected, for example, from polyurethane polymers such as polyester polyurethane and polyether polyurethane; and styrene polymers such as styrene-ethylene-butylene copolymer (SEB), styrene-butadiene-styrene copolymer (SBS), and hydrogenated products of SBS (styrene-ethylene-butylene-styrene copolymer (SEBS)), styrene-isoprene-styrene copolymer (SIS), hydrogenated products of SIS (styrene-ethylene-propylene-styrene copolymer (SEPS)), styrene-isobutylene-styrene copolymer (SIBS), styrene-butadiene-styrene-butadiene (SBSB), styrene-butadiene-styrene-butadiene-styrene (SBSBS), polystyrene, acrylonitrile styrene resin (AS resin), acrylonitrile butadiene styrene resin (ABS resin), and styrene thermoplastic elastomer (TPS) can be employed.

Further, examples of polymers that can be employed as the polymers in this embodiment include fluorine polymers such as fluororesin and fluororubber; polyamide resins such as polyamide 6, polyamide 11, polyamide 12, polyamide 66, and polyamide 610 and polyamide polymers such as polyamide elastomers; polyester resins such as polyethylene terephthalate and polybutylene terephthalate; polyvinyl chloride resins; acrylic resins such as polymethylmethacrylate; silicone elastomers; butadiene rubber (BR); isoprene rubber (IR); chloroprene (CR); natural rubber (NR); styrene butadiene rubber (SBR); acrylonitrile butadiene rubber (NBR); and butyl rubber (IIR).

The polymers to serve as the main components of the first composition and the second composition preferably have equivalent values of melt mass flow rate (MFR) so that the first composition and the second composition are easily mixed. Specifically, when the MFR of the polymer having higher MFR is referred to as "H-MFR", and the MFR of the polymer having lower MFR is referred to as "L-MFR", the ratio ("H-MFR"/"L-MFR") of the polymers employed as the main components of the first composition and the second composition is preferably 3 or less, more preferably 2 or less, further preferably 1.5 or less, still further preferably 1.2 or less, particularly preferably 1.1 or less. Further, in this embodiment, of the above-described exemplified polymers, it is preferable to use materials having high MFR as the main components of the first composition and the second composition, because of the advantage of ease of injection molding. Specifically, the polymers preferably have a MFR of 5 g/10 min or more, more preferably 10 g/10 min or more. Further, in this embodiment, of the above-described exemplified polymers, it is preferable to use ethylene-α•olefin copolymers such as ethylene-1-butene copolymer (EBM), styrene elastomers such as styrene-ethylene/butylene-styrene copolymer (SEBS), ethylene-vinyl acetate copolymer (EVA), or the like, as the polymers to serve as the main components of the first composition and the second composition, because of the advantage of ease of foam forming. The MFR of ethylene-1-butene copolymer, ethylene-vinyl acetate copolymer, or the like can be determined under conditions of a temperature of 190° C. and a nominal load of 2.16 kg. Further, the MFR of styrene-ethylene/butylene-styrene copolymer, or the like can be determined under conditions of a temperature of 230° C. and a nominal load of 2.16 kg.

The polymers may be crosslinked and foamed. The technique for crosslinking and foaming is not specifically limited, and a crosslinking agent and a foaming agent that are generally used for forming a crosslinked foam can be used also in this embodiment. As the crosslinking agent, organic peroxides, maleimide crosslinking agents, sulfur, phenolic crosslinking agents, oximes, and polyamines, for example, can be employed, but above all, organic peroxides are preferable. Further, active energy ray such as electron beam also can be used for crosslinking the polymers.

As the organic peroxides, one or two or more selected from dicumyl peroxide, di-t-butyl peroxide, 2,5-dimethyl-2,5-di-(t-butylperoxy) hexane, 2,5-dimethyl-2,5-di-(t- butylperoxy) hexyne-3, 1,3-bis(t-butylperoxyisopropyl) benzene, 1,1-bis(t-butylperoxy)-3,3,5-trimethylcyclohexane, n-butyl-4,4-bis(t-butylperoxy) valerate, benzoyl peroxide, p-chlorobenzoyl peroxide, 2,4-dichlorobenzoyl peroxide, t-butyl peroxybenzoate, t-butyl perbenzoate, t-butylperoxyisopropyl carbonate, diacetyl peroxide, lauroyl peroxide, and t-butyl cumyl peroxide, for example, can be employed.

Such an organic peroxide is used generally in a ratio of 0.01 parts by mass or more and 10 parts by mass or less, with respect to 100 parts by mass of the total of the polymers contained in the first composition and the second composition.

Further, the first composition and the second composition can contain a crosslinking aid together with the crosslinking agent. As the crosslinking aid, one or two or more selected, for example, from divinyl benzene, trimethylolpropanetrimethacrylate, 1,6-hexanediol methacrylate, 1,9-nonanediol dimethacrylate, 1,10-decanediol dimethacrylate, trimellitic acid triallyl ester, triallyl isocyanate, neopentyl glycol dimethacrylate, 1,2,4-benzenetricarboxylic acid triallyl ester, tricyclodecane dimethacrylate, and polyethylene glycol diacrylate can be employed.

Further, in this embodiment, inorganic particles having high surface energy such as clay, talc, silica, and carbon black may be contained in the first composition and the second composition, thereby allowing the inorganic particles to form pseudo crosslinking points in the first and second forming materials.

The technique for foaming the polymers is not specifically limited, and the foam can be formed by chemical foaming using an organic or inorganic chemical foaming agent or physical foaming using a physical foaming agent. As the foaming agent, one or two or more selected, for example, from azo compounds such as azodicarbonamide (ADCA), 1,1'-azobis(1-acetoxy-1-phenylethane), dimethyl-2,2'-azobisbutyrate, dimethyl-2,2'-azobisisobutyrate, 2,2'-azobis(2,4,4-trimethylpentane), 1,1'-azobis(cyclohexane-1-carbonitrile), and 2,2'-azobis[N-(2-carboxyethyl)-2-methylpropionamidine]; nitroso compounds such as N,N'-dinitrosopentamethylenetetramine (DPT); hydrazine derivatives such as 4,4'-oxybis (benzenesulfonyl hydrazide) and diphenylsulfone-3,3'-di sulfonyl hydrazide; semicarbazide compounds such as p-toluenesulfonyl semicarbazide; and thermally decomposable organic foaming agents such as trihydrazino triazine can be employed.

Further, as the foaming agent, one or two or more selected from bicarbonates such as sodium hydrogen carbonate and ammonium hydrogen carbonate, and carbonates such as sodium carbonate and ammonium carbonate; and nitrites such as ammonium nitrite, and thermally decomposable inorganic foaming agents such as hydrogen compounds can be employed.

Further, organic foaming agents including various aliphatic hydrocarbons such as methanol, ethanol, propane, butane, pentane, and hexane, and inorganic foaming agents such as air, carbon dioxide, nitrogen, argon, and water also can be used as the foaming agent for forming the crosslinked foam.

Examples of other additives to be contained in the first composition and the second composition include a dispersant, a processing aid, a weathering agent, a flame retardant, a pigment, a mold release agent, an antistatic agent, an antibacterial agent, and a deodorizer.

In the midsole 3 of this embodiment, the first composition and the second composition preferably have different color tones. When the first composition and the second composition have different color tones, the midsole 3 can have a marble pattern and gradation shown by the third part so as to have improved aesthetics.

Figure 4:
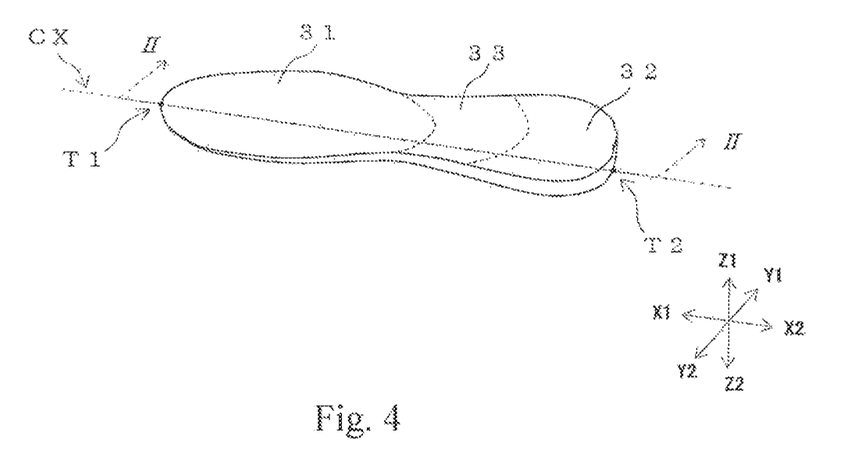
FIG. 4 is a schematic perspective view showing a midsole of another aspect.
Figure 5:
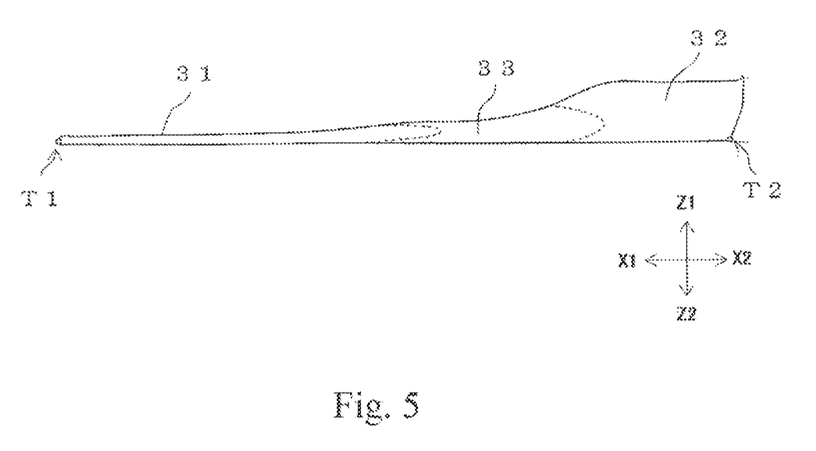
FIG. 5 is a schematic sectional view showing a section of the midsole shown in FIG. 4.

In this embodiment, a midsole in which the first part is arranged at a position corresponding to the plantar arch is described as an example, but the present invention may be such that the first part 31 is arranged at a position corresponding to the tiptoe (forefoot) and the second part 32 is arranged at a position corresponding to the heel (hindfoot), for example, as shown in FIG. 4 and FIG. 5. In this case, the shoe sole member preferably satisfies the following relational expression (4), more preferably satisfies the following relational expression (5), further preferably satisfies the following relational expression (6), when the sectional area of the first part 31 is denoted by S21 (cm$^2$), the sectional area of the second part is denoted by S22 (cm$^2$), and the sectional area of the third part is denoted by S23 (cm$^2$), in a vertical section that is the vertical plane parallel to the central axis CX of the shoe.

$$5\% \leq [100 \times S23/(S21+S22+S23)] < 100\% \quad (4)$$

$$5\% \leq [100 \times S23/(S21+S22+S23)] \leq 80\% \quad (5)$$

$$15\% \leq [100 \times S23/(S21+S22+S23)] \leq 80\% \quad (6)$$

The midsole 3 preferably satisfies the relational expression (4) at least in a vertical section passing through central axis CX of the shoe. The midsole 3 preferably satisfies the relational expression (4) in all vertical sections when the area of each part in the vertical section is determined within an interval of 5 mm or more that is continuous in the width directions, and preferably satisfies the relational expression (4) in all vertical sections within an interval of 10 mm or more. The interval in which the relational expression (4) is satisfied is generally 50 mm or less.

Further, the midsole 3 shown in FIG. 4 and FIG. 5 is preferably such that the first part 31 is harder than the second part 32, and when the hardness of the third part 33 in the vertical sections is measured while the measurement point is moved from the first part side toward the second part side, the hardness of the third part decreases toward the moving direction. Further, the midsole 3 shown in FIG. 4 and FIG. 5 preferably has a decreasing amount of hardness per unit length in the aforementioned direction of 0.1°/mm or less throughout the third part 33.

The third part 33 preferably shows such a decrease in hardness as described above at least in the vertical section of the plantar arch passing through the central axis of the shoe. The midsole 3 preferably shows such a decrease in hardness as described above in all vertical sections when the hardness of the third part 33 in the vertical sections is determined within an interval of 5 mm or more that is continuous in the width directions, and preferably shows such a decrease in hardness as described above in all vertical sections within an interval of 10 mm or more. The interval within which such a decrease in hardness as described above is shown is generally 50 mm or less.

In this embodiment, as shown in FIG. 2 to FIG. 5, the case where the first part and the second part are adjacent to each other via the third part in the horizontal direction is described as an example, but the shoe sole member of the present invention may be such that the first part and the second part are adjacent to each other via the third part in the thickness directions. That is, the comfort of the shoe of the present invention is not significantly impaired depending on the arrangement or the like of the first part and the second part.

Further, in this embodiment, the midsole is described as an example of the shoe sole member including the first part, the second part, and the third part, but the shoe sole member of the present invention may be a member other than the midsole and may be an outer sole, for example. Further, the shoe sole member and the shoe according to the present invention are not limited to the above-described embodiments in all respects, and various modifications can be made without departing from the gist of the present invention.

EXAMPLES

Next, the present invention will be described further in detail by way of examples. However, the present invention is not limited to these examples.

Figure 6:
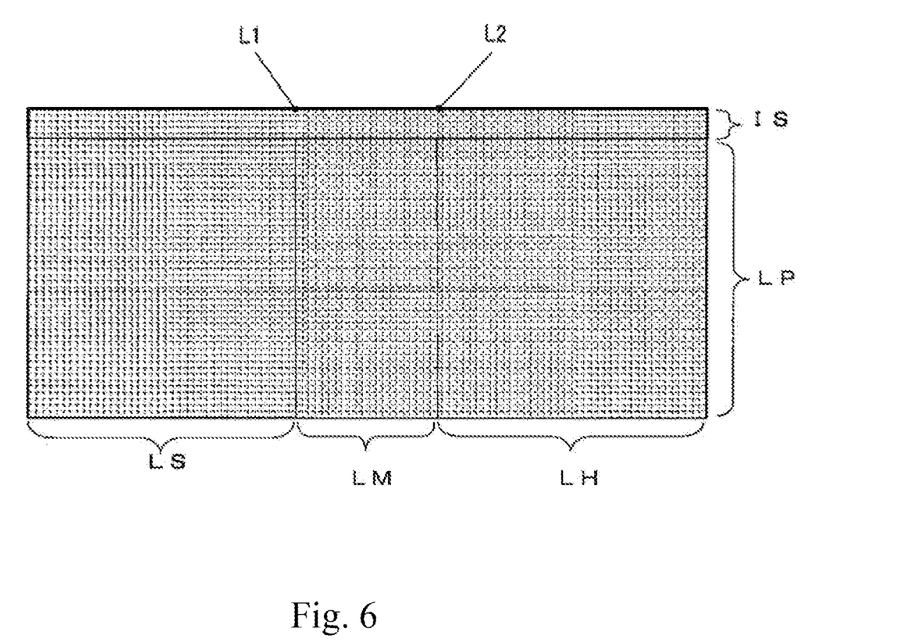
FIG. 6 is a schematic view showing a method for setting cells in determining shear stress that is generated when a compressive force is applied to the shoe sole member by simulation.

Using a shoe sole member having a section cut along a vertical plane in a laterally elongated rectangular shape with a width of 20 mm and a height of 10 mm as a model, a situation of applying a pressure to the shoe sole member was simulated by the finite element method. As shown in FIG. 6, an insole area IS with a thickness of 1 mm was formed on the top of the model of simulation. Further, a region of the model of simulation with a thickness of 9 mm (hereinafter, referred to also as "lower region LP") below the insole area IS was divided in the width directions. That is, in the model, one end side of the lower region LP in the width directions was a soft region LS, the other end side was a hard region LII, and a middle region LM was formed between them. The middle region LM corresponds to the portion shown as the third part 33 in FIG. 2 to FIG. 5 and others.

As shown in FIG. 6, the simulation was conducted by dividing the shoe sole member by 100 in the cross section in the horizontal (width) directions and by 50 in the vertical (height) directions, into 5000 elements in total. The simulation was conducted under conditions (conditions A) in which displacement in the bottom part was constrained in the translation and the rotation in all directions and conditions (conditions B) in which displacement in the bottom part was constrained in the translation and the rotation in all directions in the joint at the left end and was constrained in the translation and the rotation in the length directions and the height directions in the other joints. Further, in the simulation, shear stress generated, when a pressure of 1 MPa was applied onto the upper surface of the shoe sole member, at a point L1 (hereinafter, referred to also as "first boundary point L1") on the upper surface side of the insole area IS corresponding to the boundary between the soft region LS and the middle region LM and at a point L2 on the upper surface side of the insole area IS corresponding to the boundary between the middle region LM and the hard region LII (hereinafter, referred to also as "second boundary point L2") was determined. In the simulation, how the shear stress changed in the case where the formed width of the middle region LM was changed while the formed width of the soft region LS and the formed width of the hard region LII were maintained to be equivalent was determined.

Figure 7:
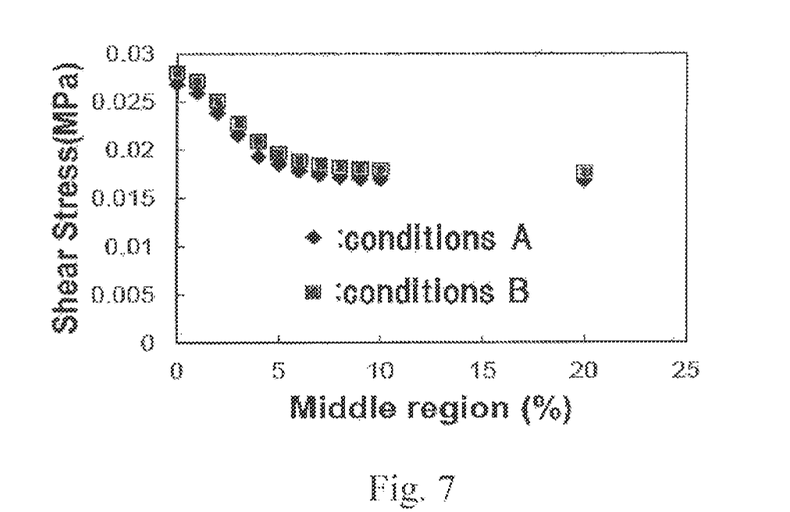
FIG. 7 is a graph showing the results of simulating shear stress that is generated between the soft region and the middle region when a compressive force is applied to the shoe sole member by another method.
Figure 8:
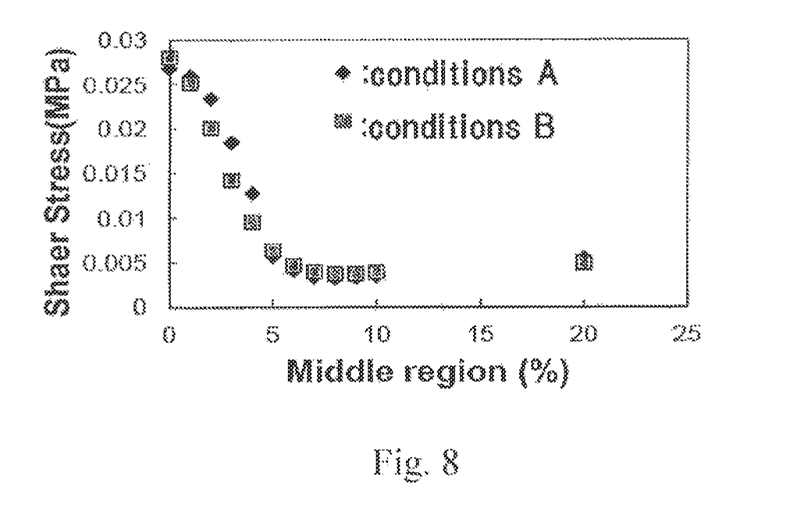
FIG. 8 is a graph showing the results of simulating shear stress that is generated between the middle region and the hard region when a compressive force is applied to the shoe sole member by another method.

FIG. 7 and FIG. 8 show the simulation results. In FIG. 7, the horizontal axis represents the formed width of the middle region LM (ratio of the middle region LM to the entire shoe sole member), and the vertical axis represents the shear stress generated at the first boundary point L1 (point at the boundary between the soft region and the middle region). Further, in FIG. 8, the horizontal axis represents the formed width of the middle region LM (ratio of the middle region LM to the entire shoe sole member), and the vertical axis represents the shear stress generated at the second boundary point L2 (point at the boundary between the middle region and the hard region). In FIG. 7 and FIG. 8, the results shown in the diamond-shaped legend are of the conditions A, and the results shown in the square legend are of the conditions B. A high value of the shear stress generated at the first boundary point L1 and the second boundary point L2 means that a strong reaction force was received when a pressure was applied to the shoe sole member, and a low value of the shear stress means that uncomfortable feeling due to the difference in hardness between the regions with the boundary interposed is less likely to be given to the user. That is, a low value of the shear stress means that excellent comfort is given to the user.

From FIG. 7 and FIG. 8, it can be seen that, when the middle region LM is formed, even in a slight amount, the shoe sole member has excellent comfort.

Subsequently, the case where the shoe sole member was formed by two types of ethylene-vinyl acetate copolymer (EVA) having different hardness or two types of chlorinated polyethylene (CPE) having different hardness was simulated. As to EVA, the case where the insole area IS, the soft region LS, the middle region LM, and the hard region LH were the foam products shown in Table 1 below was simulated. Further, as to CPE, the cases where the insole area IS, the soft region LS, the middle region LM, and the hard region LH were in two patterns shown in Tables 2 and 3 below were simulated.

TABLE 1

|  | Material code | Young's modulus | Poisson's ratio | Density (g/cm$^3$) |
| --- | --- | --- | --- | --- |
| Insole area | — | 1.5 | 0.3 | 0.2 |
| Soft region | EVA55 | 1.9 | 0.3 | 0.2 |
| Middle region | — | 3.4 | 0.3 | 0.2 |
| Hard region | EVA72 | 4.9 | 0.3 | 0.2 |

TABLE 2

|  | Material code | Young's modulus | Poisson's ratio | Density (g/cm$^3$) |
| --- | --- | --- | --- | --- |
| Insole area | — | 1.5 | 0.3 | 0.2 |
| Soft region | CPE45 | 0.55 | 0.3 | 0.2 |
| Middle region | — | 1.7 | 0.3 | 0.2 |
| Hard region | CPE72 | 2.8 | 0.3 | 0.2 |

TABLE 3

|  | Material code | Young's modulus | Poisson's ratio | Density (g/cm$^3$) |
| --- | --- | --- | --- | --- |
| Insole area | — | 1.5 | 0.3 | 0.2 |
| Soft region | CPE52 | 0.85 | 0.3 | 0.2 |
| Middle region | — | 1.3 | 0.3 | 0.2 |
| Hard region | CPE65 | 1.8 | 0.3 | 0.2 |

Figure 9:
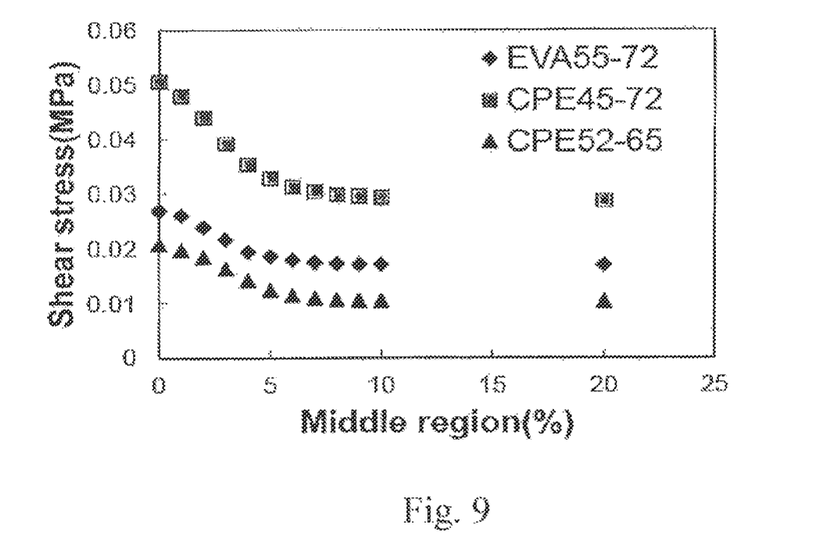
FIG. 9 is a graph showing the results of simulating the difference in situation of generation of shear stress, depending on the forming materials (between the soft region and the middle region).
Figure 10:
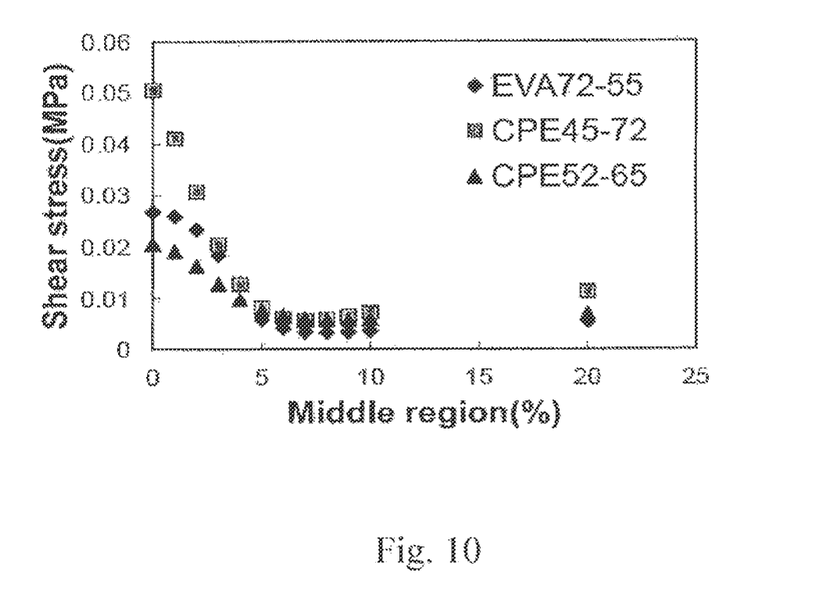
FIG. 10 is a graph showing the results of simulating the difference in situation of generation of shear stress, depending on the forming materials (between the middle region and the hard region).

FIG. 9 and FIG. 10 show these results. In FIG. 9 and FIG. 10, the results shown in the diamond-shaped legend are of EVA shown in Table 1 above, the results shown in the square are of CPE in Table 2, and the results shown in the triangle are of CPE in Table 3. Further, in FIG. 9, the horizontal axis represents the formed width of the middle region LM, and the vertical axis represents the shear stress generated at the first boundary point L1, as in FIG. 7. Further, in FIG. 10, the horizontal axis represents the formed width of the middle region LM, and the vertical axis represents the shear stress generated at the second boundary point L2, as in FIG. 8.

As is obvious also from FIG. 9 and FIG. 10, the effects that the shoe sole member with excellent comfort can be provided by forming the middle region LM and the shoe sole member having further excellent comfort can be provided by forming the middle region LM in a ratio of 5% or more are exerted regardless of the forming materials or the like of the shoe sole member. Also from above, it can be seen that the present invention provides a shoe sole member that is effective in forming a shoe with excellent comfort, and accordingly provides a shoe with excellent comfort.

REFERENCE SIGNS LIST

1: Shoe
3: Midsole
4: Outer sole
31: First part
32: Second part
33: Third part

What is claimed is:

1. A shoe sole member, formed by at least two different polymer compositions, a first polymer composition and a second polymer composition, comprising:
   a first part formed by the first polymer composition;
   a second part formed by the second polymer composition; and
   a third part formed by a mixture of the first polymer composition and the second polymer composition between the first part and the second part, wherein:
   the first part has an Asker C hardness higher than the second part, and
   the value of an Asker C hardness of the third part in a cross section orthogonal to a central axis of the shoe sole member continuously decreases throughout the third part from a side of the first part toward a side of the second part.

2. The shoe sole member according to claim 1, wherein:
   the Asker C hardness of the first part is 50° or more and 80° or less,
   the Asker C hardness of the second part is 35° or more and 65° or less, and
   a difference in Asker C hardness between the first part and the second part is 4° or more and 20° or less.

3. The shoe sole member according to claim 1, wherein a decreasing amount of the Asker C hardness of the third part continuously decreasing from the side of the first part toward the side of the second part is 0.1°/mm or less.

4. The shoe sole member according to claim 2, wherein a decreasing amount of the Asker C hardness of the third part continuously decreasing from the side of the first part toward the side of the second part is 0.1°/mm or less.

5. The shoe sole member according to claim 1, wherein:
   the first polymer composition and the second polymer composition each include a polymer having a melt mass flow rate of 5 g/10 min or more, and
   the polymer is any one of ethylene-α′ olefin copolymer, styrene polymer, and ethylene-vinyl acetate copolymer.

6. The shoe sole member according to claim 2, wherein:
   the first polymer composition and the second polymer composition each include a polymer having a melt mass flow rate of 5 g/10 min or more, and
   the polymer is any one of ethylene-α′ olefin copolymer, styrene polymer, and ethylene-vinyl acetate copolymer.

7. The shoe sole member according to claim 3, wherein:
   the first polymer composition and the second polymer composition each include a polymer having a melt mass flow rate of 5 g/10 min or more, and
   the polymer is any one of ethylene-α′ olefin copolymer, styrene polymer, and ethylene-vinyl acetate copolymer.

8. The shoe sole member according to claim 4, wherein:
   the first polymer composition and the second polymer composition each include a polymer having a melt mass flow rate of 5 g/10 min or more, and
   the polymer is any one of ethylene-α′ olefin copolymer, styrene polymer, and ethylene-vinyl acetate copolymer.

9. A shoe comprising the shoe sole member according to claim 1.

* * * * *

UNITED STATES PATENT AND TRADEMARK OFFICE
CERTIFICATE OF CORRECTION

| | | |
|---|---|---|
| PATENT NO. | : 11,576,461 B2 | Page 1 of 1 |
| APPLICATION NO. | : 17/491747 | |
| DATED | : February 14, 2023 | |
| INVENTOR(S) | : Tanaka et al. | |

It is certified that error appears in the above-identified patent and that said Letters Patent is hereby corrected as shown below:

On the Title Page

Delete the following:
"(30) Foreign Application Priority Data
Sep. 28, 2015 (JP) ......................... 2015/076782"

Signed and Sealed this
Eighteenth Day of February, 2025

Coke Morgan Stewart
*Acting Director of the United States Patent and Trademark Office*